(No Model.)

A. G. McCOY.
INSERTED SAW TOOTH.

No. 580,950. Patented Apr. 20, 1897.

Attest:
M. R. Thomas
A. J. Thomas

Inventor:
Alexander G. McCoy,
By Geo. P. Thomas
His Atty.

UNITED STATES PATENT OFFICE.

ALEXANDER G. McCOY, OF BAY CITY, MICHIGAN.

INSERTED SAW-TOOTH.

SPECIFICATION forming part of Letters Patent No. 580,950, dated April 20, 1897.

Application filed January 6, 1896. Serial No. 574,537. (No model.)

*To all whom it may concern:*

Be it known that I, ALEXANDER G. MCCOY, a citizen of the United States, residing at Bay City, in the county of Bay and State of Michigan, have invented certain new and useful Improvements in Inserted Saw-Teeth, of which the following is a specification, reference being had therein to the accompanying drawings.

This invention relates to improvements in insertible teeth for saws, and pertains more particularly to that class of saws which are provided with a curved recess to receive the mouthpiece and bit of the tooth, which are rolled into position in the said recess and held therein by numerous means of locking.

One of the objects of the invention is to provide a tooth for a saw which may be inserted in a recess describing the arc of a circle in the saw and leaving sufficient material in the body of the saw to receive the strain and resistance required when in operation instead of placing the same on the inserted tooth.

Another object of the invention is to provide a tooth for a saw which when inserted in a recess in the saw will firmly secure the bit of the tooth in position and at the same time allow the said bit the desired pitch or hook.

Another object of the invention is to provide a saw-tooth composed of a mouthpiece and a bit which may be cheaply constructed and which when placed in position in a recess in the saw will form a firm solid lock therein, preventing any liability of the parts working loose when the saw is in operation, and which at the same time may be easily extracted or inserted in said recess.

I attain these objects by means of the devices illustrated in the accompanying drawings, in which the same figures of reference will be found indicating like parts throughout the several views, and in which—

Figure 1:
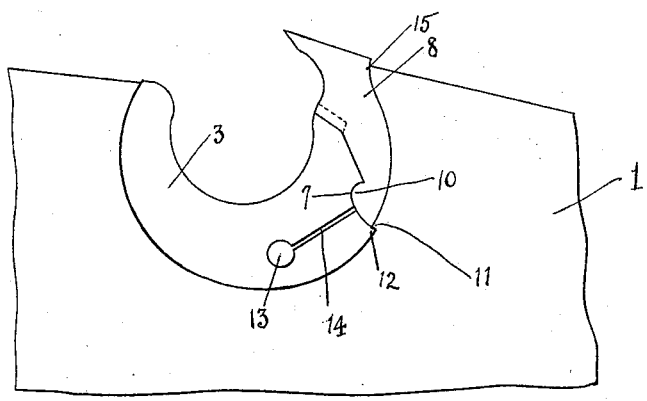
Figures 2, 3:
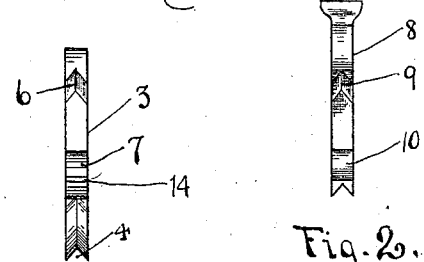
Figure 4:
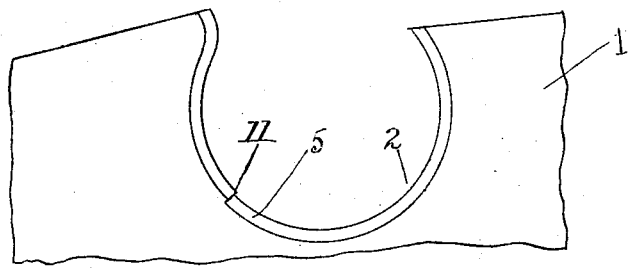

Figure 1 is a side view of a section of a saw with my improved tooth inserted therein. Fig. 2 is a front view of the bit-piece detached. Fig. 3 is a rear view of the mouthpiece detached. Fig. 4 is the same as Fig. 1 with the tooth detached.

1 represents the body of the saw and is provided with a recess 2, the forward portion 16 of which describes the arc of one circle, while its rear portion 17 describes the arc of another circle slightly smaller, and this recess is provided with an inwardly-extending V-shaped ridge 5.

3 is a mouthpiece provided on its back (which describes the arc of a circle to correspond with the portion 16 of the recess 2) with a V-shaped groove 4, and this mouthpiece 3 is rolled or turned into the recess 2, the ridge 5 fitting into the said groove 4.

6 is a short outwardly-projecting V-shaped ridge on the rear end of the mouthpiece 3, extending rearwardly from its inner edge, and from the end of this ridge the mouthpiece is cut downwardly and provided on its lower portion with a recess 7.

8 is a bit-piece with its back describing a continuation of the arc of the circle described by the back of the mouthpiece 3 and provided with a similar V-shaped groove for engaging with the ridge 5 in the portion 17 of the recess 2, while 15 is a shoulder on the back of the bit at the upper end of this groove for resting against the body of the saw 1.

The under side of the bit 8 is provided with a V-shaped groove 9 for engaging with the ridge 6 on the mouthpiece, and the bit is then cut downwardly to coincide with the end of the mouthpiece, and 10 is a lug on the lower end of said bit for fitting into the recess 7 in the mouthpiece.

The recess 2 is provided with a small shoulder 11 at the point where portions 16 and 17 are joined, and a very slight projection 12 is allowed on the end of the mouthpiece for resting against this shoulder when the parts are in position.

The mouthpiece 3 is provided with a small cylindrical opening 13 in its side for engaging with a tool for inserting or extracting the tooth, and 14 is a slot extending from this opening 13 to the recess 7 to allow a slight spring to the mouthpiece when inserting or extracting the tooth.

To insert the tooth in the recess 2, the mouthpiece 3 and bit-piece 8 are placed in position and the parts are rolled or turned in the recess 2 until the shoulder 15 on the back of the bit 8 comes in contact with the top of the saw-body 1, and the diameter of the recess 2 being slightly decreased near its chord causes the parts to lock or bind, while the projection 12 at this point has passed over and rests against the shoulder 11, forming a solid lock for the parts, and the lug 10 on the bit-piece 8, resting in the recess 7, firmly holds the said bit-piece in position, which is prevented from any lateral play or working loose by the V-shaped ridge 6 on the mouthpiece engaging with the groove 9 in the bit-piece.

It will be readily seen that by this means a firm and solid lock is formed for the tooth, which when placed in position will prevent any liability of the parts working loose, and by the formation of the bit-piece herein shown a large amount of material is allowed in the body of the saw directly behind the shoulder 15 to receive the strain and resistance of the tooth when in operation, and at the same time the bit is allowed the desired pitch or hook.

Having described my invention, what I claim as new, and desire to secure by Letters Patent, is—

The combination with a saw-plate having a recess whose edge is formed by two unequal arcs or segments, a shoulder in said recess where the two arcs are joined, of a saw-tooth composed of a mouthpiece having its rear edge engaging with the larger arc of said recess, and with its rear end engaging with said shoulder in said recess, and a bit-piece engaging with the smaller arc of said recess, with a V-shaped ridge on the rear end of said mouthpiece for engaging with a V-shaped groove in the under side of said bit-piece to prevent any lateral movement of said bit-piece, substantially as set forth.

In testimony whereof I affix my signature in presence of two witnesses.

ALEXANDER G. McCOY.

Witnesses:
M. R. THOMAS,
G. P. THOMAS.